US012580345B2

(12) United States Patent
Kropiewnicki

(10) Patent No.: US 12,580,345 B2
(45) Date of Patent: Mar. 17, 2026

(54) LOCKING MECHANISM FOR A HIGH-CURRENT ELECTRICAL CONNECTOR

(71) Applicant: HARTING ELECTRIC STIFTUNG & CO. KG, Espelkamp (DE)

(72) Inventor: Norbert Kropiewnicki, Bielefeld (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 765 days.

(21) Appl. No.: 17/921,912

(22) PCT Filed: Apr. 16, 2021

(86) PCT No.: PCT/DE2021/100346
§ 371 (c)(1),
(2) Date: Oct. 27, 2022

(87) PCT Pub. No.: WO2021/219162
PCT Pub. Date: Nov. 4, 2021

(65) Prior Publication Data

US 2023/0178930 A1 Jun. 8, 2023

(30) Foreign Application Priority Data

Apr. 29, 2020 (DE) ..................... 10 2020 111 610.1

(51) Int. Cl.

| | |
|---|---|
| ***H01R 13/62*** | (2006.01) |
| ***H01R 13/627*** | (2006.01) |
| ***H01R 13/639*** | (2006.01) |
| ***H01R 13/66*** | (2006.01) |
| ***H01R 13/717*** | (2006.01) |

(52) U.S. Cl.
CPC ....... *H01R 13/6278* (2013.01); *H01R 13/639* (2013.01); *H01R 13/6683* (2013.01); *H01R 13/7175* (2013.01)

(58) Field of Classification Search
CPC .......................... H01R 13/6278; H01R 13/639
See application file for complete search history.

(56) References Cited

U.S. PATENT DOCUMENTS

| | | | | |
|---|---|---|---|---|
| 5,002,500 A * | 3/1991 | Zuccaro | H01R 13/53 439/378 |
| 7,192,303 B2 * | 3/2007 | Kohen | H02G 3/20 439/537 |

(Continued)

FOREIGN PATENT DOCUMENTS

| | | |
|---|---|---|
| CN | 101228670 A | 7/2008 |
| CN | 202059000 U | 11/2011 |

(Continued)

OTHER PUBLICATIONS

International Search Report and Written Opinion, mailed Jun. 17, 2021, for International Patent Application No. PCT/DE2021/100346. (15 pages) (with English translation of International Search Report).

(Continued)

*Primary Examiner* — Neil Abrams
(74) *Attorney, Agent, or Firm* — Seed Intellectual Property Law Group LLP

(57) ABSTRACT

An electrical connector socket is provided, which has a locking device with which an electrical connector can be locked to the electrical connector socket when plugged in, wherein the locking device is arranged at least partly inside the electrical connector socket and protrudes at least partly from the electrical connector socket on the plug-in side. The electrical connector is provided for transmitting high currents and signals, wherein the electrical connector as a locking contour, into which a locking device of an electrical connector socket can engage, wherein the locking contour is arranged on the electrical connector on the plug-in side.

22 Claims, 3 Drawing Sheets

(56) References Cited

U.S. PATENT DOCUMENTS

| | | | | |
|---|---|---|---|---|
| 7,828,586 | B2 * | 11/2010 | Gorczyca | H01T 23/00 439/489 |
| 7,914,320 | B2 * | 3/2011 | Ko | H01R 13/7175 439/490 |
| 8,313,336 | B2 * | 11/2012 | Bondo | H04R 25/556 439/324 |
| 2009/0156042 | A1 | 6/2009 | Radenne et al. | |
| 2019/0115693 | A1 | 4/2019 | Troeger et al. | |
| 2020/0169039 | A1 | 5/2020 | Vollmer et al. | |

FOREIGN PATENT DOCUMENTS

| | | | |
|---|---|---|---|
| CN | 104518359 | A | 4/2015 |
| CN | 107084347 | A | 8/2017 |
| CN | 109103656 | A | 12/2018 |
| CN | 111064048 | A | 4/2020 |
| DE | 10 2012 021 502 | A1 | 5/2014 |
| DE | 10 2016 105 975 | A1 | 10/2017 |
| DE | 10 2017 200 596 | A1 | 7/2018 |
| DE | 10 2017 108 490 | A1 | 10/2018 |
| EP | 3 230 114 | B1 | 10/2017 |
| WO | 2019/034201 | A1 | 2/2019 |

OTHER PUBLICATIONS

Office Action, dated Nov. 18, 2021, for German Patent Application No. 10 2020 111 610.1 (6 pages).

International Preliminary Report on Patentability, issued Oct. 27, 2022, for International Application No. PCT/DE2021/100346, 15 pages.

* cited by examiner

LOCKING MECHANISM FOR A HIGH-CURRENT ELECTRICAL CONNECTOR

BACKGROUND

Technical Field

This disclosure relates to an electrical connector socket and to a matching electrical connector. This disclosure additionally relates to a system comprising an electrical connector socket and an electrical connector. Furthermore, this disclosure relates to a method for breaking an electrical connection.

Electrical connector sockets and electrical connectors may be used in some instances for transmitting high currents.

Description of the Related Art

DE 10 2017 108 490 B4 shows an electrical connector socket and a matching electrical connector. The electrical connector socket has a pivotable locking clip, which can be locked on the electrical connector. The system comprising the electrical connector socket and the electrical connector is monitored via a control unit. The locking clip can be transferred into the unlocking position only when the connection is free of current and voltage. As a result, what is known as “pulling under load” is not possible.

The aforementioned locking clip and the associated monitoring electronics are very large. Therefore, such a solution is not suitable for many applications. Since the mechanical locking is attached to the outside of the locking clip, it is additionally prone to contamination and/or damage.

BRIEF SUMMARY

Embodiments disclosed herein provide a reliable, compact and robust solution which, in an electrical connection, prevents the electrical connection from being pulled apart in the operating state—what is known as pulling under load.

Embodiments disclosed herein relate to an electrical connector socket for an electrical connector. If an electrical connector is plugged into an electrical connector socket, this is also designated as electrical connection. As a result of plugging an electrical connector into the electrical connector socket, an electrical connection is produced. This electrical connection is broken again by pulling the electrical connector out of the electrical connector socket.

The electrical connector socket and the associated electrical connector are in this case not restricted to industrial application areas. The electrical connection according to the disclosure is explicitly also designed for use in the private environment. The area of use relates in particular to applications which require high current transmission, for example during a charging operation.

The electrical connector socket according to embodiments of this disclosure has a locking device with which an electrical connector can be locked to the electrical connector socket when plugged in. In this case, locked means that the electrical connector—when plugged in—cannot be pulled out of the electrical connector socket with a normal application of force. The locking is maintained until the electrical connector can safely be pulled out of the electrical connector socket again. Safe breaking of the electrical connection means, for example, that the production of an electric arc is substantially ruled out. Any damage and/or danger to a user and the devices connected to the electrical connection is reduced at least to a minimum.

The locking device is arranged substantially inside the electrical connector socket. This means that the locking device is located substantially inside the electrical connector housing and is not arranged outside on the electrical connector. As a result, the locking of such an electrical connection cannot be inadvertently (or deliberately) forgotten, which offers a great safety advantage. At least one part of the locking device protrudes from the electrical connector socket on a plug-in side of the electrical connector socket. The protruding part of the locking device, like the contact elements, is arranged in a plug-in area of the electrical connector socket.

The electrical connector socket preferably has an octagonal cross section. The electrical connector socket forms a connector face. The connector face is understood to be the arrangement of the contact elements which, in a plan view, are located in the plug-in area of the electrical connector socket—or of a corresponding electrical connector. The part of the locking device protruding out of the electrical connector socket is preferably a part of the connector face. Advantageously, the locking device or its protruding part is arranged centrally in the connector face and at least partly ringed around or surrounded by the contact elements. As a result, one-sided loading of the contact elements during an attempt to break the electrical connection in the operating state is avoided. Ideally, the locking device projects substantially flush with at least one of the contact elements.

Preferably, the locking device is an electromechanical locking device. The purely mechanical components are able to ensure locking even when there is no current. The electrical components release the electrical connection only when an electronic check about freedom from voltage has been made. The electrical connector socket can have an energy store which ensures the electrical release when the device is completely separated from an input of energy or no input of energy is possible.

Preferably, the locking device has a mechanical blocking element. The blocking element has at least one spring-supported blocking pin which, for the mechanical locking of the electrical connection, can engage in a blocking opening assigned to it in the electrical connector.

It is additionally particularly advantageous if the blocking element has two blocking pins aligned oppositely to each other, which are coupled to each other via a spring. The blocking pins then engage in two blocking openings of the electrical connector, which are arranged oppositely, analogous to the blocking pins. Mechanical locking of this type has proven to be very reliable.

It is advantageous if the blocking pins are each molded on a respective base. The base and the blocking pin then each form a component which can be produced economically, for example from plastic, in an injection-molding process. The two bases are configured to be geometrically complementary to each other. This means that the bases interengage when brought together. The two bases are coupled to each other via the aforementioned spring.

In a particularly advantageous embodiment of the invention, the locking device has a movable locking slide. The locking slide comprises a piston which has a U-shaped fork at the end. The mechanical blocking element can be blocked via the U-shaped fork. The blocking is carried out, for example, by the U-shaped fork moving between the bases of the blocking pins, so that the latter can no longer be guided towards each other and, as a result, the blocking pins can no longer be guided out of the blocking openings.

Preferably, the locking device has a lifting magnet. The locking slide can be moved by the lifting magnet. The piston can be moved back and forth in the plug-in direction, so that—depending on position—the U-shaped fork is able to block and release the blocking pins.

It is advantageous if the locking device has a first microswitch, with which the position of the locking slide can be detected. Here, the microswitch functions as a sensor and detects whether the U-shaped fork is in a blocking function or in a release position. In the blocking function, the blocking element is blocked. In the release position, the fork is not located in the active range of the blocking element.

Advantageously, the electrical connector socket has an electronic evaluation unit with an RFID antenna. The first microswitch supplies data to this evaluation unit, so that it is known to the latter whether the fork is in the blocking or release position.

Advantageously, the locking device has a U-shaped handgrip. The mechanical blocking element can be blocked—analogous to the U-shaped fork—with the U-shaped handgrip. On one side, the mechanical blocking element of the locking device can be blocked by the U-shaped fork and, on the opposite side, by the U-shaped handgrip. Only when both blocking devices (fork and handgrip) have been removed is the blocking element released, so that the electrical connector can be pulled out of the electrical connector socket.

In a particularly advantageous embodiment of the invention, the U-shaped handgrip has legs that can be moved relative to one another. Preferably, the legs that can be moved relative to one another are coupled to one another via a spring. The spring force urges the legs into their closed, i.e., U-shaped, form. This position is also designated as the blocking position. The legs can be opened counter to the spring force with the aid of an unlocking mechanism which is arranged in the electrical connector, whereby the blocking element is released. This position is also designated as the release position of the handgrip.

It is particularly advantageous if the electrical connector has an RFID tag. The data stored on the RFID tag can be read via the RFID antenna of the evaluation unit. As a result, the evaluation unit knows that the electrical connector has been plugged into the electrical connector socket.

It is particularly advantageous if the electrical connector has a visual indicating unit which outputs a plug-in status. A first plug-in status could indicate that voltage is present in the electrical connection. In this way, it can already be detected visually that the electrical connection must not be broken. A second plug-in status could indicate that no voltage is present in the electrical connection any longer. In this way, it becomes visually detectable that the electrical connection may be broken.

Advantageously, the indicating unit could consist of an LED indicator which is able to complete a color change. Here, for example the first status "voltage present" could be identified via a red light, and the second status "voltage-free" via a green light.

In the following text, a plug-in and withdrawal operation will be explained by using an exemplary embodiment of an electrical connection according to the invention. However, the invention is not restricted to this embodiment.

The electrical connector is plugged into the electrical connector socket. In the process, two opposite blocking pins of the locking device of the socket latch in associated blocking openings of the locking contour of the electrical connector. The blocking pins are blocked on the plug-in side via the U-shaped handgrip.

As soon as a transfer of energy takes place, the pins are additionally blocked on the connection side by the U-shaped fork by the latter being moved into the blocking position by the lifting magnets.

The optical indicating unit lights up red and thus signals that a voltage is present on the electrical connection and the latter must therefore not be broken.

Before any possible withdrawal of the electrical connector, the evaluation unit of the electrical connector socket checks whether the electrical connection is voltage-free. If it is not voltage-free, the U-shaped fork is not guided out of its blocking position. The indicating unit continues to light up red and the electrical connection cannot be broken even if the handgrip is in its open position (release position).

If it is voltage-free, the U-shaped fork is moved back into its release position by the lifting magnet. The optical indicating unit lights up green.

By way of the unlocking mechanism integrated into the electrical connector, the U-shaped handgrip is opened and thereby moved into its release position.

Only when the U-shaped fork (on the connection side) and the U-shaped handgrip (on the plug-in side) are each located in the release position can the electrical connection be broken, i.e., the electrical connector can be pulled out of the electrical connector socket.

BRIEF DESCRIPTION OF THE SEVERAL VIEWS OF THE DRAWINGS

An exemplary embodiment of the invention is illustrated in the drawings and will be explained in more detail below. In the drawings.

The figures may contain partly simplified, schematic illustrations. To some extent, identical designations are used for elements which are the same but possibly not identical. Different views of the same elements could be scaled differently.

DETAILED DESCRIPTION

Figure 1:
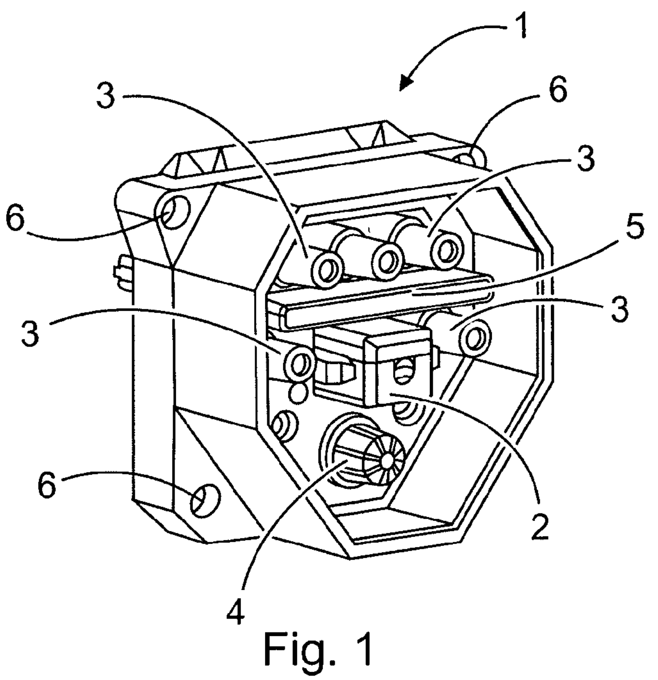
FIG. 1 shows a perspective illustration of an electrical connector socket according to an embodiment of the invention.

FIG. 1 shows an electrical connector socket 1 according to an example embodiment of the invention. The electrical connector socket 1 is, for example, attached to housings of electrical devices which, at least from time to time, need a great deal of energy or which comprise a battery which must be charged up regularly.

To fix the electrical connector socket 1, for example to a device wall, the electrical connector socket 1 has lugs in the corner regions of its housing with openings 6 arranged therein which, for example, can be used for a screw fastening.

The electrical connector housing 1 has a locking device 2. The locking device 2 is arranged at least partly inside the electrical connector socket 1 or its housing. On the plug-in side, the locking device 2 protrudes from the electrical connector socket 1.

The connector face of an electrical connector socket 1 and of a connector 10 (FIG. 2) is defined by the arrangement of the contact elements (and, if appropriate, of further functional elements) which can be seen on the plug-in side. The electrical connector socket 1 or its housing has an octagonal cross section. The connector face is formed by the arrangement of the contact elements and of the further visible functional elements, such as locking device and evaluation unit or RFID antenna, within this octagonal geometry.

The electrical connector socket 1 has five power contact elements 3 within its connector face, which are designed for transmitting high currents. The power contact elements 3 are arranged substantially like an inverted U in the connector face (from the view of FIG. 1). In the lower region of the connector face, a signal contact element 4 is arranged. Data and/or control signals can be transmitted via the latter.

The electrical connector socket 1 has an electronic evaluation unit 5 with an integrated RFID antenna. At least part of the RFID antenna and possibly also part of the evaluation unit 5 protrudes from the electrical connector socket 1 on the plug-in side, and therefore forms part of the connector face of the electrical connector socket 1.

Figure 2:
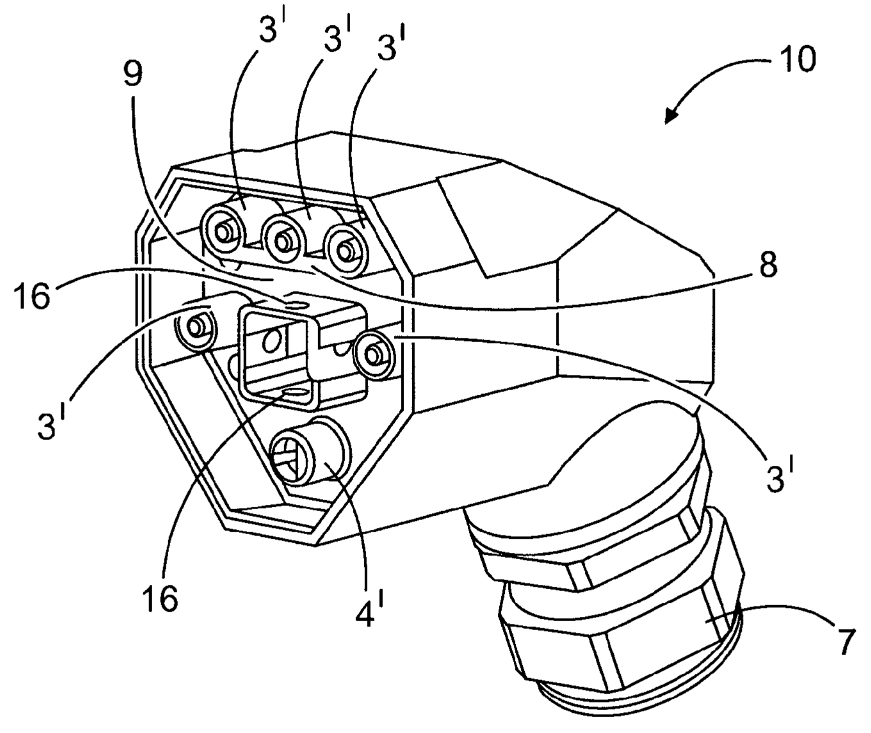
FIG. 2 shows a perspective illustration of an electrical connector according to an embodiment of the invention.

In FIG. 2, it is possible to see an electrical connector 10 according to an example embodiment of the invention, which can be plugged into the electrical connector socket 1 and therefore forms an electrical connection. The electrical connector 10 has five power contact elements 3' and a signal contact element 4'. The power contact elements 3' and the signal contact element 4' are arranged in a way analogous to the connector face of the electrical connector socket 1 and can be contacted electrically hereby.

Centrally in the connector face, the electrical connector 10 has a locking contour 9 which corresponds to the protruding part of the locking device 2 of the electrical connector socket 1. Arranged above the locking contour 9 is an RFID tag which, when it is plugged in, corresponds to the RFID antenna of the evaluation unit 5. The electrical connector 10 has a cable screw fixing 7 for a cable to be connected (not shown).

Figure 3:
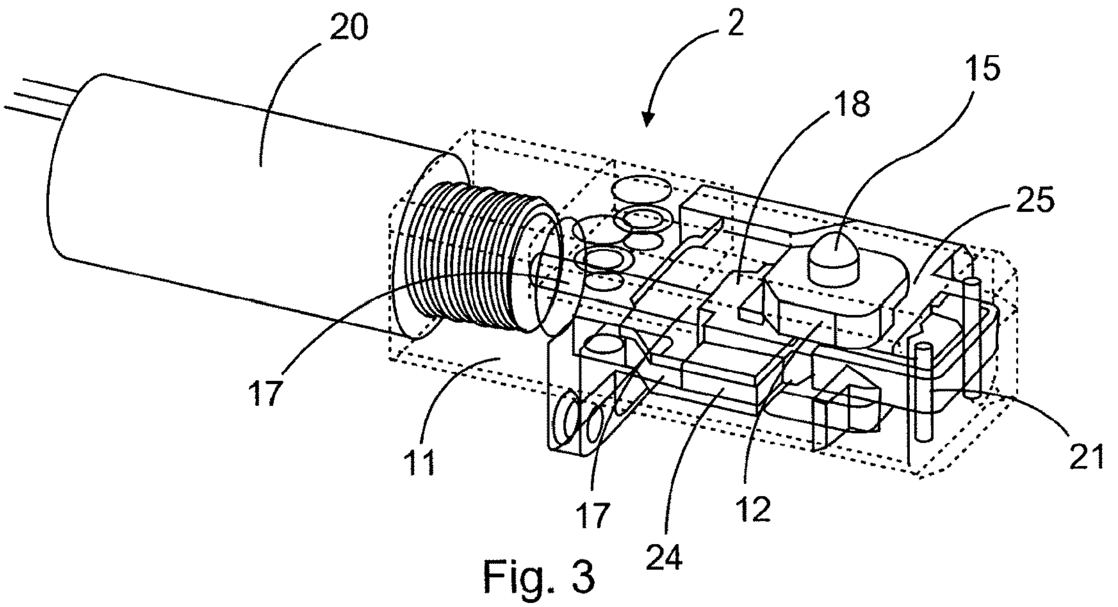
FIG. 3 shows a perspective and partially transparent illustration of a locking device integrated in the electrical connector socket.

Shown in FIG. 3 is the locking device 2 which is integrated in the electrical connector socket 1. This is an electromechanical lock, in which purely mechanical components interact with electrical and/or electronic components. The housing 11 of the locking device 2 is illustrated transparently in FIG. 3, in order that the components located therein can be seen.

Figure 6:
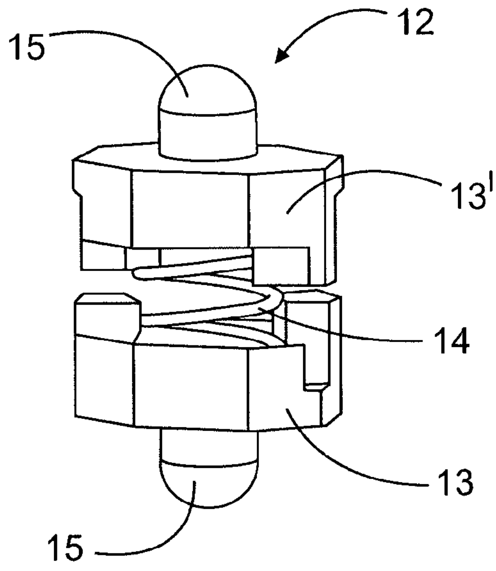
FIG. 6 shows a perspective illustration of a blocking element.
Figure 7:
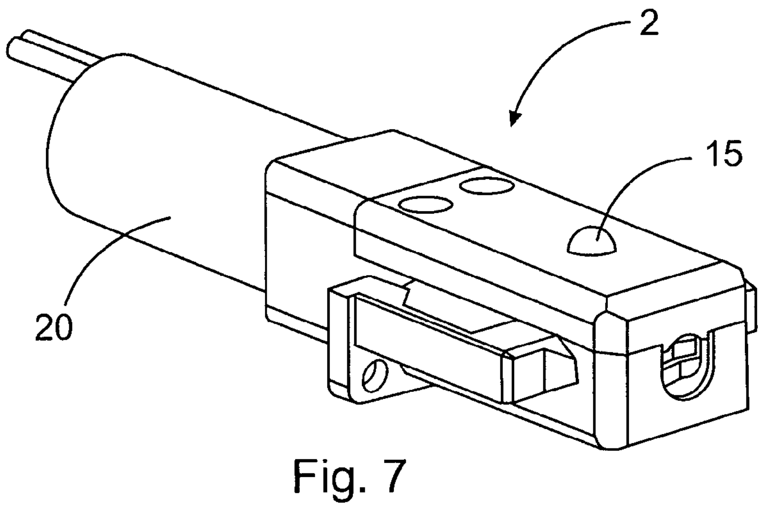
FIG. 7 shows a perspective illustration of the locking device integrated in the electrical connector socket.
Figure 8:
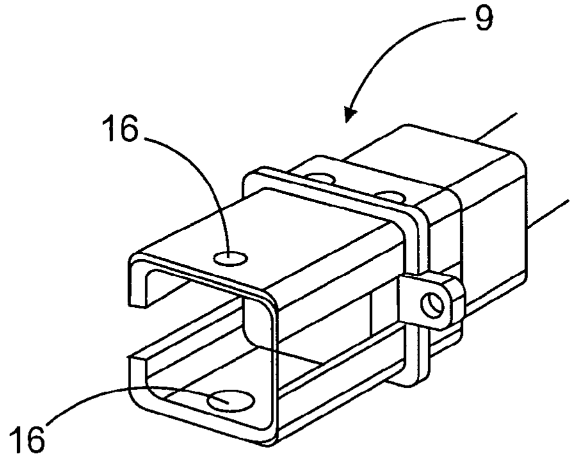
FIG. 8 shows a perspective illustration of the locking contour integrated in the electrical connector.

The locking device 2 has a blocking element 12. The blocking element 12 is illustrated enlarged in FIG. 6. The blocking element 12 comprises two bases 13, 13' which are coupled via a spring 14 and which each have a blocking pin 15 protruding perpendicularly therefrom. The bases 13, 13' are configured geometrically such that they can interengage in complementary fashion. The blocking pins 15 are oriented oppositely to each other. The blocking pins 15 have a hemispherical tip at the ends. When they are plugged in, the blocking pins 15 engage in the blocking opening 16 assigned to them in the locking contour 9 of the electrical connector 10.

The locking device 2 has a movable locking slide 17 which, at its end, has a U-shaped fork 18. The locking slide 17 can be moved back and forth in the plug-in direction—along the double arrow 19 shown in FIG. 4—via a lifting magnet 20. In the locked state, the fork 18 is located between the bases 13, 13' of the blocking element 12 and blocks the blocking pins 15 located in the blocking openings 16, so that the electrical connector socket 1 and the electrical connector 10 are locked together and the electrical connection cannot be broken. The fork 18 is in this outlined blocking position in FIG. 4.

The locking device 2 has a U-shaped handgrip 21. The handgrip 21 substantially comprises two L-shaped legs 21*a*, 21*b*, which are coupled to each other via a spring 22. By way of the spring 22, the legs 21*a*, 21*b* are driven into their U-shape, which represents the basic position of the handgrip 21. In the locked state, the closed handgrip 21 is located between the bases 13, 13' of the blocking element 12 and therefore blocks the blocking pins 15 located in the blocking openings 16, so that the electrical connection cannot be broken. The handgrip 21 is in its blocking position in FIG. 4.

During the connection operation, the electrical connector 10 is plugged into the electrical connector socket 1. In the process, two opposite blocking pins 15 of the locking device 2 of the electrical connector socket 1 latch into associated blocking openings 16 in the locking contour 9 of the electrical connector 10. The blocking pins 15 are blocked by the U-shaped handgrip 21 on the plug-in side or connector side.

As soon as a transmission of energy takes place, the pins 15 are additionally blocked on the connection side or socket side by the U-shaped fork 18, in that the latter is moved into the blocking position (FIG. 4) by the lifting magnet 20. The optical indicating unit lights up red and thus signals that there is a voltage on the electrical connection and the latter must therefore not be broken.

The position of the fork 18 can be registered by the evaluation unit 5 via a first microswitch 24. The open or closed position of the handgrip 21 can be registered by the evaluation unit 5 in a corresponding way via a second microswitch 25.

Figure 4:
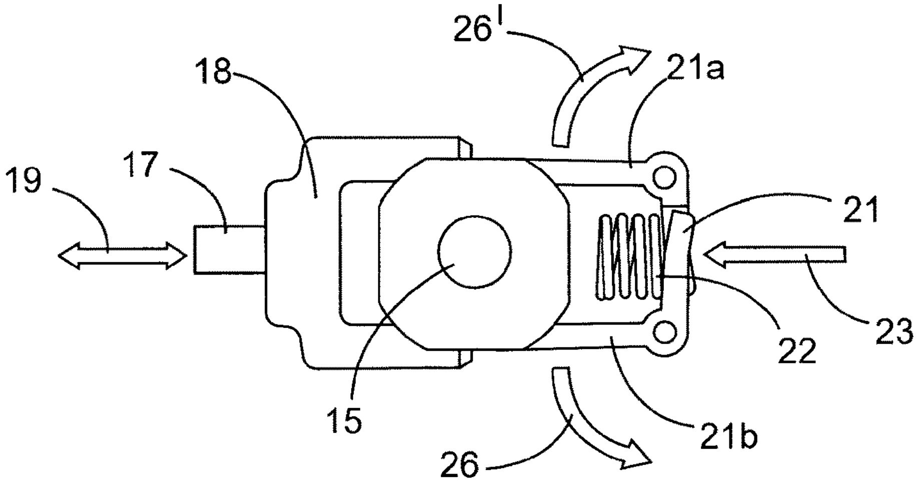
FIG. 4 shows a top view of individual components of the locking device in its blocking position.

In the plugged-in-state, the evaluation unit 5 of the electrical connector socket 1 receives information via the RFID tag of the electrical connector 10. The evaluation unit 5 of the electrical connector socket 1 checks, continuously or regularly or at least before a potential withdrawal of the electrical connector 10, whether the electrical connection is voltage-free. If it is not voltage-free, the U-shaped fork 18 is not drawn or moved out of its blocking position (FIG. 4). In this case, the indicating unit lights up red and, as a result, shows that the electrical connection cannot be broken.

Figure 5:
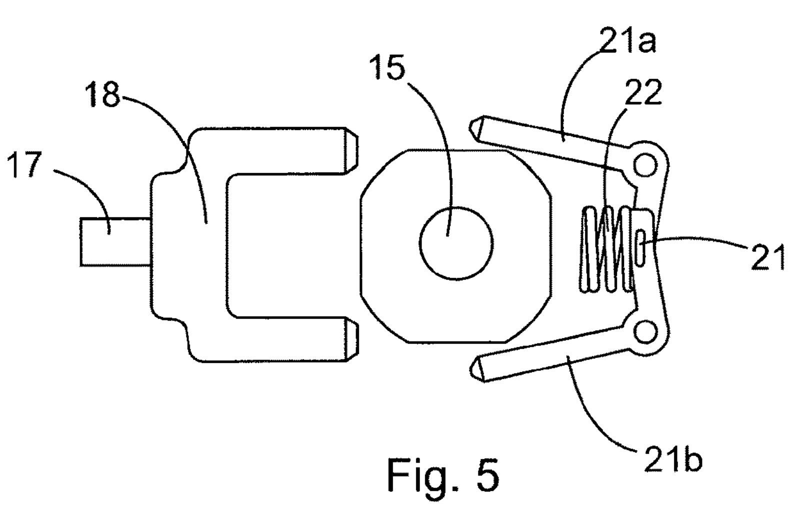
FIG. 5 shows a top view of individual components of the locking device in its release position.

If the evaluation unit 5 establishes the voltage-free state, the U-shaped fork 18 is moved back into its release position by the lifting magnet 20. The release position is illustrated in FIG. 5. In this case, the optical indicating unit lights up green.

By way of the unlocking mechanism integrated in the electrical connector 10, the U-shaped handgrip 21 can then also be opened and, as a result, moved into its release position, which is illustrated in FIG. 5. The unlocking mechanism is substantially a pin (not shown), which presses in the direction of the arrow 23 shown in FIG. 4 on the spring area of the handgrip 21, as a result of which its legs 21*a*, 21*b* are each moved in the direction of the arrows 26, 26' shown in FIG. 4, and the handgrip 21 is thereby opened.

The pin (not shown) can be moved on the electrical connector 10 via a pushbutton (not shown) on the outside of the electrical connector 10.

Only when the U-shaped fork 18 (on the connection side) and the U-shaped handgrip 21 (on the plug-in side) are each located in their release position (FIG. 5) can the electrical connection be broken, i.e., the electrical connector 10 can be pulled out of the electrical connector socket 1.

Even if various aspects or features of the embodiments of the invention are each shown in combination in the figures, it is clear to those skilled in the art—if not otherwise indicated—that the combinations illustrated and discussed are not the only ones that are possible. In particular, mutually corresponding units or feature composites from different exemplary embodiments can be interchanged with one another. Accordingly, aspects or features of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrical connector socket comprising:

a locking device configured to lock an electrical connector to the electrical connector socket when the electrical connector is plugged in to the electrical connector socket, wherein the locking device is arranged at least partly within the electrical connector socket and protrudes at least partly from the electrical connector socket on a plug-in side of the electrical connector socket, and wherein the locking device includes both an electromechanically actuated locking element that is displaceable between a locked configuration and an unlocked configuration and a manually actuated locking element that is displaceable between a locked configuration and an unlocked configuration, whereby the electrical connector can only be removed from the electrical connector socket when both the electromechanically actuated locking element and the manually actuated locking element are in their unlocked configurations.

2. The electrical connector socket as claimed in claim 1, wherein the electrical connector socket forms a connector face, and wherein a part of the locking device, which protrudes from the electrical connector socket, is a constituent part of the connector face.

3. The electrical connector socket as claimed in claim 1, wherein the locking device is an electromechanical locking device.

4. The electrical connector socket as claimed in claim 1, wherein the locking device has a blocking element which has at least one spring-supported blocking pin, which engages in a blocking opening assigned to the spring-supported blocking pin in the electrical connector.

5. The electrical connector socket as claimed in claim 4, wherein the blocking element has two blocking pins aligned oppositely to each other.

6. An electrical connector socket comprising:

a locking device configured to lock an electrical connector to the electrical connector socket when the electrical connector is plugged in to the electrical connector socket, wherein the locking device is arranged at least partly within the electrical connector socket and protrudes at least partly from the electrical connector socket on a plug-in side of the electrical connector socket, wherein the blocking element has two spring-supported blocking pins which each engage in a respective blocking opening assigned to each spring-supported blocking pin in the electrical connector, and wherein the two spring-supported blocking pins are aligned oppositely to each other and each molded on a respective base, wherein the bases are configured to be complementary to each other and are coupled to each other via a spring.

7. An electrical connector socket comprising:

a locking device configured to lock an electrical connector to the electrical connector socket when the electrical connector is plugged in to the electrical connector socket, wherein the locking device is arranged at least partly within the electrical connector socket and protrudes at least partly from the electrical connector socket on a plug-in side of the electrical connector socket, wherein the locking device has a blocking element which has at least one spring-supported blocking pin, which engages in a blocking opening assigned to the spring-supported blocking pin in the electrical connector, and wherein the locking device has a movable locking slide which has a U-shaped fork an end thereof which blocks and releases the blocking element.

8. The electrical connector socket as claimed in claim 7, wherein the locking device has a lifting magnet which moves the locking slide.

9. The electrical connector socket as claimed in claim 7, wherein the locking device has a first microswitch, which detects the position of the locking slide.

10. The electrical connector socket as claimed in claim 9, wherein the locking device has a U-shaped handgrip, which blocks and releases the blocking element.

11. The electrical connector socket as claimed in claim 10, wherein the U-shaped handgrip has legs that can be moved relative to one another.

12. The electrical connector socket as claimed in claim 11, wherein the legs that can be moved relative to one another are coupled to one another via a spring.

13. The electrical connector socket as claimed in claim 10, wherein the locking device has a second microswitch, which detects whether the U-shaped handgrip is in a blocking position or in a release position.

14. The electrical connector socket as claimed in claim 1, wherein the electrical connector socket has an electronic evaluation unit with an RFID antenna.

15. An electrical connector for transmitting high currents and signals, the electrical connector engageable with an electrical connector socket having a locking device that includes both an electromechanically actuated locking element that is displaceable between a locked configuration and an unlocked configuration and a manually actuated locking element that is displaceable between a locked configuration and an unlocked configuration, the electrical connector comprising:

a locking contour in which the locking device of the electrical connector socket can engage, wherein the locking contour is arranged on the electrical connector on a plug-in side of the electrical connector, and a manually actuated element that is configured to move the manually actuated locking element of the locking device of the electrical connector socket to its unlocked configuration when the manually actuated element of the electrical connector is displaced by a user, wherein the electrical connector can only be removed from the electrical connector socket when both the electromechanically actuated locking element and the manually actuated locking element of the locking device are in their unlocked configurations.

16. The electrical connector as claimed in claim 15, wherein the electrical connector has a connector face, and the locking contour is part of the connector face.

17. The electrical connector as claimed in claim 15, wherein the electrical connector has an RFID tag.

18. The electrical connector as claimed in claim 15, wherein the electrical connector has a visual indicating unit, which indicates a plug-in status of the electrical connector.

19. The electrical connector as claimed in claim 18, wherein the visual indicating unit is an LED light unit.

20. A system comprising:

an electrical connector socket; and an electrical connector, wherein the electrical connector socket includes a locking device configured to lock the electrical connector to the electrical connector socket when the electrical connector is plugged in to the electrical connector socket, wherein the locking device is arranged at least partly within the electrical connector socket and protrudes at least partly from the electrical connector socket on a plug-in side of the electrical connector socket, wherein the electrical connector includes a locking contour arranged on a plug-in side of the electrical connector to receive the locking device of the electrical connector socket when the electrical connector is plugged in to the electrical connector socket, and wherein the locking device includes both an electromechanically actuated locking element that is displaceable between a locked configuration and an unlocked configuration and a manually actuated locking element that is displaceable between a locked configuration and an unlocked configuration, whereby the electrical connector can only be removed from the electrical connector socket when both the electromechanically actuated locking element and the manually actuated locking element are in their unlocked configurations.

21. A system comprising:

an electrical connector socket; and an electrical connector, wherein the electrical connector socket includes a locking device configured to lock the electrical connector to the electrical connector socket when the electrical connector is plugged in to the electrical connector socket, wherein the locking device is arranged at least partly within the electrical connector socket and protrudes at least partly from the electrical connector socket on a plug-in side of the electrical connector socket, wherein the electrical connector includes a locking contour arranged on a plug-in side of the electrical connector to receive the locking device of the electrical connector socket when the electrical connector is plugged in to the electrical connector socket, and wherein the electrical connector has an unlocking mechanism with which a U-shaped handgrip of the locking device is opened and which releases a mechanical blocking element of the locking device as a result.

22. A method for breaking an electrical connection between an electrical connector socket and an electrical connector, wherein in the plug-in state, at least one blocking pin of a locking device of the electrical connector socket latches into an associated blocking opening in a locking contour of the electrical connector, wherein the at least one blocking pin is blocked on the plug-in side via a U-shaped handgrip and wherein, as soon as a transmission of energy takes place, the at least one blocking pin is additionally blocked on a connection side by a U-shaped fork of the locking device, the method comprising:

before a possible withdrawal of the electrical connector, checking, via an evaluation unit of the electrical connector socket, whether the electrical connection is voltage-free and, only when the electrical connection is voltage-free, moving the U-shaped fork into a release position, wherein the U-shaped handgrip is likewise moved into a release position by an unlocking mechanism integrated in the electrical connector, and wherein the electrical connection is then broken by the electrical connector being pulled out of the electrical connector socket.

* * * * *